United States Patent
Fedora

[19]

[11] Patent Number: 6,115,932
[45] Date of Patent: Sep. 12, 2000

[54] FISH RULER CONSTRUCTION

[76] Inventor: Brian S. Fedora, 98 New Bridge Rd., Salem, N.J. 08079

[21] Appl. No.: 09/177,750

[22] Filed: Oct. 23, 1998

[51] Int. Cl.[7] .............................. G01B 3/10; G01B 5/02; A01K 97/00
[52] U.S. Cl. .................. 33/758; 33/511; 33/494
[58] Field of Search ............................ 33/758, 494, 511, 33/759, 760

[56]  References Cited

U.S. PATENT DOCUMENTS

| | | | |
|---|---|---|---|
| 2,932,897 | 4/1960 | Huber | 33/758 |
| 3,259,988 | 7/1966 | Lunn | 33/511 |
| 4,149,320 | 4/1979 | Troyer et al. | 33/758 |
| 4,351,113 | 9/1982 | Eggertsen et al. | 33/758 |
| 4,367,590 | 1/1983 | Winter et al. | 33/758 |
| 4,845,858 | 7/1989 | Thomas | 33/494 |
| 5,012,590 | 5/1991 | Wagner et al. | 33/494 |
| 5,097,617 | 3/1992 | Craven | 33/485 |
| 5,339,532 | 8/1994 | O'Keefe | 33/485 |
| 5,526,575 | 6/1996 | Hoover et al. | 33/485 |

*Primary Examiner*—Christopher W. Fulton
*Attorney, Agent, or Firm*—Henderson & Sturm LLP

[57]  ABSTRACT

A multi layered adhesive backed fish ruler construction 10 for attachment to a substrate 100 such as a cooler or a flat surface on a fishing boat. The construction 10 comprises a bottom layer including an elongated thin flat strip of plastic material 40 fixedly secured to a substrate 100 and provided with both luminous length indicia 22 and various fish silhouette indicia 23 and one or more generally similar overlying strips of plastic material 30 and 40 releasably secured to one another and to the bottom strip of plastic material 40.

7 Claims, 1 Drawing Sheet

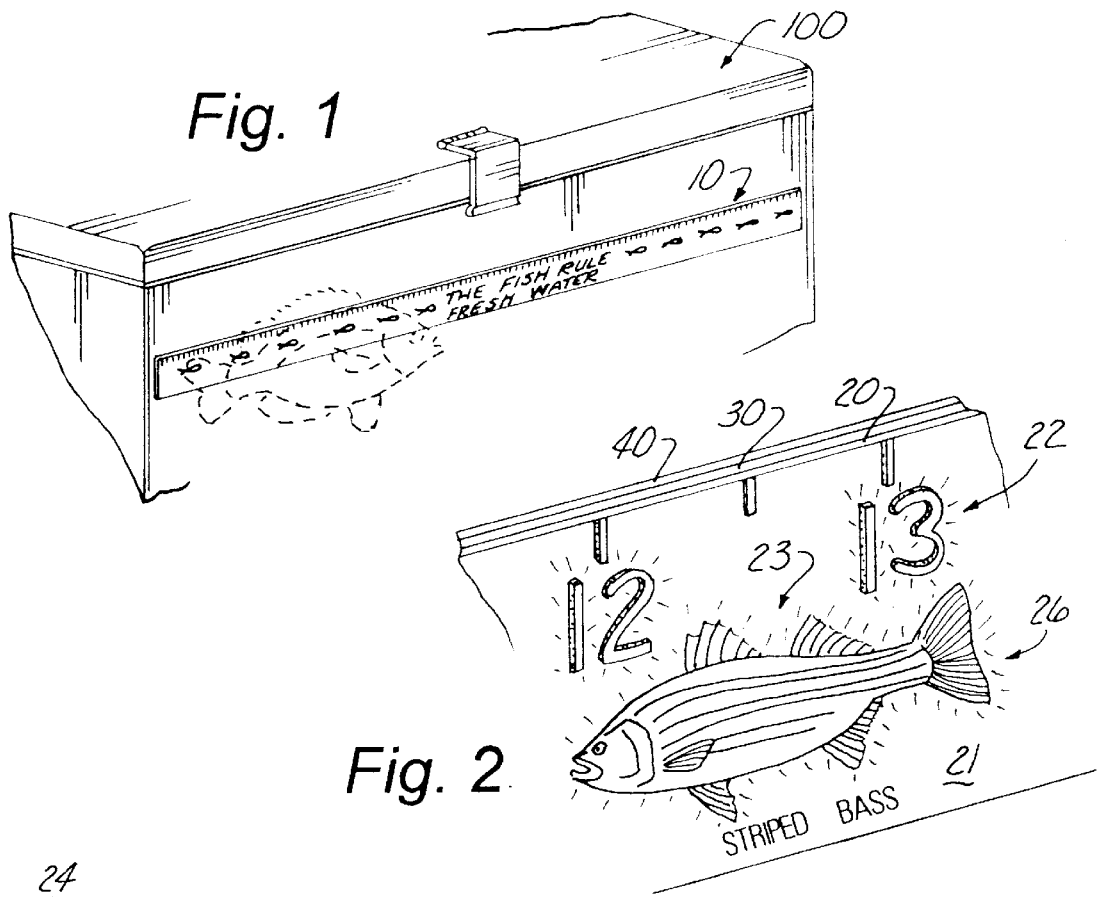
Fig. 1
Fig. 2
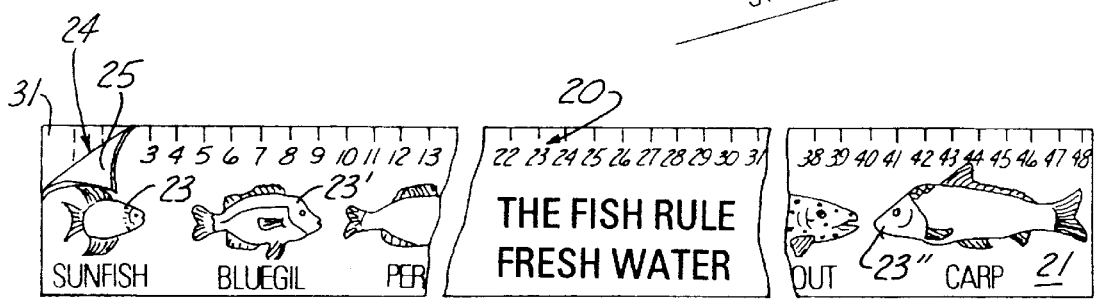
Fig. 3
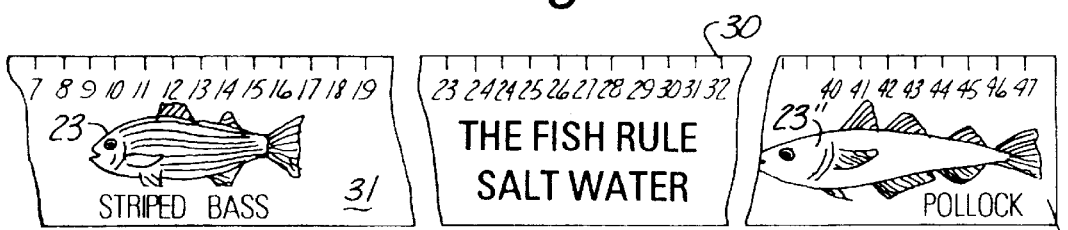
Fig. 4

FISH RULER CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of adhesive backed rulers in general, and in particular to a luminous multilayered adhesive backed ruler specifically designed for fishermen.

2. Description of Related Art

As can be seen by reference to the following U.S. Pat. Nos. 2,932,897; 4,149,320; 4,351,113; and 4,367,590, the prior art is replete with myriad and diverse adhesive backed measuring tapes.

While all of the aforementioned prior art constructions are more than adequate for the basic purpose and function for which they have been specifically designed, they are uniformly deficient with respect to their failure to provide a simple, efficient, and practical self stick measuring tape specifically designed for fishermen to measure their catch both during the daylight hours and at night to insure that the particular fish caught meets or exceeds the minimum size requirements for that species.

As most fishermen are all too well aware, one of the major problems with fishing at night is the difficulty in quickly and easily determining whether or not the fish that they just caught meets the minimum size requirement, and if it does not, they are obliged to release the fish as quickly as possible.

As a consequence of the foregoing situation, there has existed a longstanding need for a new and improved type of fish ruler having luminous length and species indicia against which they can measure their catch at night to effect a fast release of the catch if necessary, and the provision of such a construction is a stated objective of the present invention.

BRIEF SUMMARY OF THE INVENTION

Briefly stated, the improved fish ruler construction that forms the basis of the present invention comprises in general, a multi-layer adhesive backed ruler member provided with luminous length and species indicia representative of the minimum size requirement for different salt and freshwater species.

As will be explained in greater detail further on in the specification, the multilayer aspect of this invention provides several additional benefits in that it allows the top layer which will become degraded from repetitive contact with the scales of the fish to be removed so that a fresh layer can be exposed and/or it allows the freshwater fish indicia on one layer to be replaced with the saltwater fish indicia or vice versa.

It should also be noted that the luminous silhouettes of the various fish species are visually distinctive and that the tail end portion of each fish silhouette is aligned with the length indicia corresponding with the minimum legal length for that particular species.

Furthermore, the fisherman can tell at a glance whether or not the fish is of a legal size by holding one end of the fish against the front end of the ruler and checking to see whether the other end of the fish completely obscures the corresponding fish silhouette.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the fish ruler construction adhered to a cooler or the like;

FIG. 2 is an enlarged detail view of representative length and fish species indicia;

FIG. 3 is a front plan view of the fresh water version of the fish ruler construction; and FIG. 4 is a front plan view of the salt water version of the invention.

DETAILED DESCRIPTION OF THE INVENTION

As can be seen by reference to the drawings, and in particularly to FIG. 1, the fish ruler construction that forms the basis of the present invention is designated generally by the reference number 10. As shown in FIGS. 2 through 4, the construction 10 comprises a plurality of elongated thin flat strips of plastic material 20, 30 and 40 arranged in a multi-layered yardstick style fashion. Each strip of material such as 20 has a front face 21 provided with luminous indicia 22, 23 and a rear face 24 provided with an adhesive coating 25 for reasons that will be explained presently.

As can best be seen by reference to FIG. 2, the luminous indicia 22, 23 comprise both length indicia 22 and various fish silhouette indicia 23. The tail portion 26 of the different fish species indicia 23, 23', 23", etc. are generally aligned with the length indicia 22 corresponding to the minimum legal length for that corresponding species of fish.

Turning now to FIGS. 3 and 4, it can be seen that the fish indicia 23 on the front face 21 of the top layer or strip of material 20 may be different from the fish indicia 23 on the front face 31 of the next strip of material 30. One class of fish indicia 23 would represent fresh water fish as shown in FIG. 3 and the other class of fish indicia 23 would represent salt water fish as shown in FIG. 4.

As can best be appreciated by reference to FIGS. 1 through 3, the bottom strip of plastic material 40 has a very strong adhesive coating provided on its bottom face to generally fixedly secure the bottom strip of plastic 40 to a substrate 100 such as a cooler or the sides of the stern of a boat so that the ruler construction 10 will always be available for ready reference when needed.

In addition, the succeeding layers or strips of plastic material 30 and 20 are provided with a much lighter adhesive coating, so that when the indicia 22, 23 on the top strip of material becomes worn, the top strip of material 20 can be removed and discarded to expose the front face 31 of the next strip of material 30.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A multi-layer fish ruler construction comprising:

a first thin flat strip of plastic having a front face provided with luminous indicia including both length indicia and selected fish silhouette indicia representative of a first class of fish and a rear face provided with an adhesive coating for attaching said first thin strip of plastic to a first substrate; and, a second thin flat strip of plastic having a front face provided with luminous indicia including both length indicia and selected fish silhouette indicia representative of a second class of fish and a rear face provided with an adhesive coating for attaching said second thin strip of plastic to a second substrate; wherein, said first substrate includes the front face of said second thin flat strip of plastic.

2. The construction as in claim 1; wherein, said first class of fish and said second class of fish are the same.

3. The construction as in claim 2; wherein, said first and second class of fish represent fresh water species of fish.

4. The construction as in claim 2; wherein, said first and second class of fish represent salt water species of fish.

5. The construction as in claim 1; wherein, said first class of fish and said second class of fish are different.

6. The construction as in claim 5; wherein, one of said first and second classes of fish represent fresh water species of fish and the other of said first and second classes of fish represent salt water species of fish.

7. The construction of claim 1; wherein, said selected fish silhouette indicia are selectively aligned relative to selected length indicia.

\* \* \* \* \*